United States Patent
Nelson, Jr.

Patent Number: 5,890,090
Date of Patent: Mar. 30, 1999

[54] HALF-DEAD-RECKONING CAPABLE GPS NAVIGATION RECEIVER

[75] Inventor: Robert Leonard Nelson, Jr., Austin, Tex.

[73] Assignee: Trimble Navigation Limited, Sunnyvale, Calif.

[21] Appl. No.: 753,109

[22] Filed: Nov. 20, 1996

[51] Int. Cl.⁶ .......................... G01C 21/00; G06F 165/00; G06G 7/78

[52] U.S. Cl. .......................... 701/213; 701/217; 342/352

[58] Field of Search .......................... 701/200, 207, 701/213, 214, 215, 216, 217; 342/357, 358; 340/990, 995; 73/178 R

[56] References Cited

U.S. PATENT DOCUMENTS

| | | | |
|---|---|---|---|
| 4,949,268 | 8/1990 | Nishikawa et al. | 364/449 |
| 5,257,195 | 10/1993 | Hirata | 364/449 |
| 5,307,277 | 4/1994 | Hirano | 364/449 |
| 5,339,246 | 8/1994 | Kao | 364/457 |
| 5,365,447 | 11/1994 | Dennis | 364/449 |
| 5,374,933 | 12/1994 | Kao | 342/357 |
| 5,390,125 | 2/1995 | Sennott et al. | 364/449 |
| 5,394,333 | 2/1995 | Kao | 364/450 |
| 5,590,043 | 12/1996 | McBurney | 364/449.1 |
| 5,646,857 | 7/1997 | McBurney et al. | 364/449.7 |
| 5,689,252 | 11/1997 | Ayanoglu et al. | 340/991 |
| 5,740,048 | 4/1998 | Abel et al. | 364/443 |
| 5,745,868 | 4/1998 | Geier | 701/216 |

*Primary Examiner*—William A. Cuchlinski, Jr.
*Assistant Examiner*—Tim Wyckoff
*Attorney, Agent, or Firm*—Thomas E. Schatzel; Law Offices of Thomas E. Schatzel, a Prof. Corporation

[57] ABSTRACT

A half-dead reckoning satellite navigation receiver comprises a receiver for tracking and acquisition of two, three, four or more satellites and for computing navigation solutions from the available satellites. A navigation computer is included that provides for navigation when only three satellites are visible by constraining the altitude. The navigation computer further provides for a half-dead-reckoning mode of operation when only two satellites are visible and the altitude is constrained by providing a one dimensional satellite navigation solution. The receiver position is projected by dead reckoning with the projection corrected in one axis only that is perpendicular to the available horizontal line of position.

7 Claims, 1 Drawing Sheet

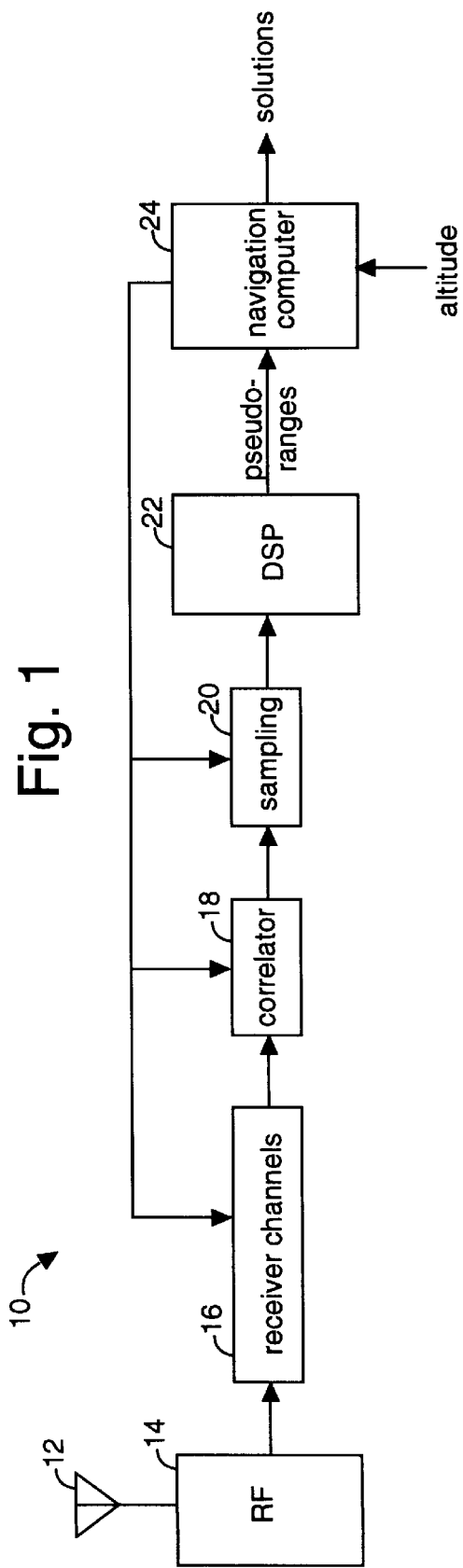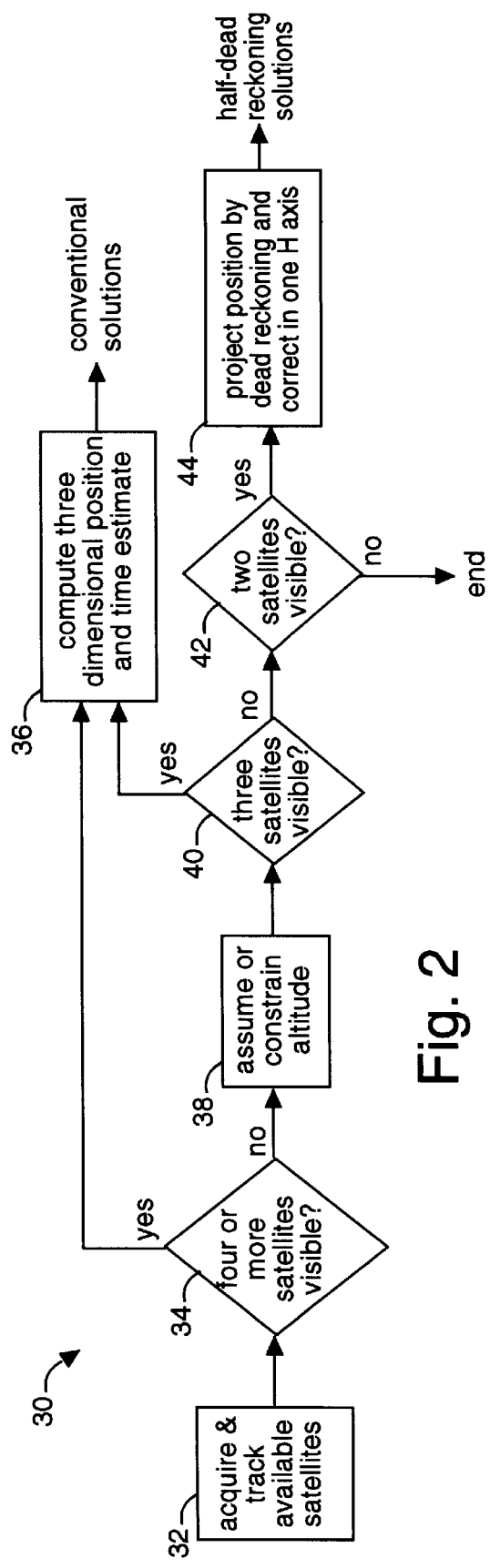

HALF-DEAD-RECKONING CAPABLE GPS NAVIGATION RECEIVER

BACKGROUND OF THE INVENTION

1. Field of the Invention

The invention relates generally to global positioning system devices and navigation receivers and more specifically to methods and apparatus for providing continuing position solutions in adverse signal conditions.

2. Description of the Prior Art

Triangulation, range navigation, hyperbolic navigation, etc., have long been used to provide position solutions for navigation. The comparatively old OMEGA navigation system used for aircraft navigation typically required that the aircraft be in receipt of signals from at least three fixed ground stations, and was like the global positioning system (GPS) in that time was an unknown. A "half dead reckoning" method was developed that allowed partial, less precise navigation to continue when only two OMEGA ground stations were being received.

In the global positioning system (GPS), more than just the three-dimensional position must be determined. The time must also be known very precisely. Therefore, each GPS navigation receiver ordinarily requires that the signals from at least four orbiting satellites be received to compute the four dimensional solution that includes time. Since the orbiting satellites are ever changing in their three dimensional positions relative to the receiver, it is preferable that the constellation geometry not include any two satellites that have too acute an angle between them, e.g., for the best position dilution of precision (P-DOP).

Recent GPS technology developments have been made that deal with ground vehicle navigation and the urban canyon problem and the complete loss of signals from moving through tunnels and buildings. The urban canyon restricts the visible satellites to those with the highest elevation, e.g., near zenith. Some of the solutions proposed have included dead reckoning system integration with the GPS navigator. For example, turning rate sensors and speedometers mounted on cars and trucks have been used to propagate the position solutions conventionally provided by the GPS navigator during GPS signal blackout or periods of partial loss.

Where the altitude is known or can be assumed, the signals from a minimum of three orbiting GPS satellites can be used to provide navigation. For example, the altitude of a ship on the ocean can be assumed to have an altitude of sea level. This is similar to having available a fourth satellite at the center of the earth. The earth surface position and time of day can be used to look up the tide in a database to make the altitude assumption even more precise. Similarly, the altitude of an airplane can be obtained from an altimeter, e.g., corrected for local barometric pressure.

It can happen, for a variety of reasons, that only two GPS satellites are visible to the navigator. But it is not always the case that those two will have similar elevations and azimuths that prevent a favorable geometry for a solution that describes a line.

SUMMARY OF THE PRESENT INVENTION

It is therefore an object of the present invention to provide a navigation satellite receiver that continues producing usable position information with as few as two visible navigation satellites in a favorable geometry.

It is another object of the present invention to provide a GPS navigation receiver that is useful in poor signal environments.

Briefly, a half-dead reckoning satellite navigation receiver embodiment of the present invention comprises a receiver for tracking and acquisition of two, three, four or more satellites and for computing navigation solutions from the available satellites. A navigation computer is included that provides for navigation when only three satellites are visible by constraining the altitude. The navigation computer further provides for a half-dead-reckoning mode of operation when only two satellites are visible and the altitude is constrained by providing a one dimensional satellite navigation solution. The receiver position is projected by dead reckoning with the projection corrected in one axis only that is perpendicular to the available horizontal line of position.

An advantage of the present invention is that a navigation satellite receiver is provided that provides a hybrid of CPS navigation solutions in one horizontal solution and dead reckoning solutions in an orthogonal direction for two visible satellites.

Another advantage of the present invention is that a half dead reckoning navigation satellite receiver is provided that will ultimately bound the dead reckoning solutions in a variety of directions by virtue of the changing geometry of two visible satellites being tracked.

These and other objects and advantages of the present invention will no doubt become obvious to those of ordinary skill in the art after having read the following detailed description of the preferred embodiment that is illustrated in the drawing figures.

IN THE DRAWINGS

FIG. 1 is block diagram of a navigation satellite receiver embodiment of the present invention; and FIG. 2 is a graph that represents the method used by the receiver of FIG. 1.

DETAILED DESCRIPTION OF THE PREFERRED EMBODIMENT

FIG. 1 illustrates a navigation satellite receiver embodiment of the present invention, referred to herein by the general reference numeral 10.

The receiver 10 may be based on the global positioning system (GPS) maintained by the United States, the global navigation satellite system (GLONASS) maintained by the Russian government, or any of a number of private system types now being launched. The present invention does not necessarily depend on the use of any particular kind of satellite navigation receiver, nor does it depend on the use of satellite navigation at all. What is required is a fairly reliable information source that provides the vehicle's position on a fairly regular basis. Any type of satellite navigation receiver that provides pseudoranges can be used. The following description related to satellite navigation receiver 10 is provided to illustrate one possible example of a functional system.

The receiver 10 comprises an antenna 12 for receiving L-band microwave radio transmissions from orbiting navigation satellites. Ordinarily, in order to provide three dimensional position and velocity solutions, a minimum of four such satellites must be visible to the antenna 12. A radio frequency (RF) amplifier 14 boosts the radio signals for downconversion and demodulation. A plurality of receiver channels 16 are used to downconvert signals from the visible satellites.

The navigation satellites each transmit a direct sequence spread spectrum signal modulated by a unique pseudorandom number code that is 1023 chips long and that repeats each one millisecond. The navigation data is modulated on top of this at a fifty baud rate. A plurality of correlators 18 provide processing gains that lift the transmitting signal out of the noise. A plurality of samplers 20 digitize the signals for processing by a digital signal processor (DSP) 22. A navigation computer 24 is used to compute the receiver's position, velocity and acceleration from the conventional pseudo-range, time and satellite ephemeris information decoded by the DSP 22. If the altitude is known, or can be assumed, one less satellite than is ordinarily required needs to be tracked in order to determine a position fix. Such altitude information is shown in FIG. 1 as being input to the navigation computer 24. For example, the altitude information can be provided from the altimeter of a plane, or can be set to zero if on-board a ship at sea. Alternatively, the altitude information can be assumed to not have deviated much from the altitude determined by the last full four-satellite fix, or the altitude can be projected from an altitude velocity determined by a series of previous full four-satellite fixes in a current solution that was degraded by having less than four satellites available.

FIG. 2 illustrates a method of the present invention for half-dead-reckoning navigation, referred to herein by the general reference numeral 30. The method 30 is preferably implemented as a computer program included in the navigation computer 24 (FIG. 1). The method 30 includes a step 32 for acquiring and tracking the available satellites. A step 34 determines whether four or more satellites are available. If so, a step 36 uses conventional GPS techniques to compute the position, time and velocity of the receiver 10. If less than four satellites are visible, a step 38 injects an assumed or otherwise externally provided altitude constraint. A step 40 determines whether three satellites are available. If so, control passes to the step 36. Otherwise, a step 42 determines whether two satellites are available. If so, a step 44 uses the information available from the measurements from the two satellites to project the position by dead reckoning with the correction made in one horizontal axis. The projections made by dead reckoning can later be bounded with subsequent measurements taken from the two visible satellites. These later measurements provide a plurality of different one-dimensional line solutions of position because the satellites change their positions constantly. For a definition of "line of position" and other relevant concepts, see, B. Hofman-Wellenhof, et al., *GPS Theory and Practice*, Springer-Verlag, ISBN 3-211-82477-4 or 0-387-82477-4. It can happen that the changing positions of the satellites provide the geometry to completely bound the dead reckoning projections.

The relative velocities between the receiver 10 and each of the respective navigation satellites being tracked causes a Doppler shift in the apparent carrier frequency from each. Given that the positions of each navigation satellite and the receiver 10 are known, which they ordinarily are, the geometry amongst them can be computed and the velocity of the receiver 10 can be determined. Acceleration is the rate of change of velocity and the acceleration of the receiver 10 can also be determined by comparing successive velocity solutions. The receiver channels are tuned to each satellite's signal and provide pseudo-range information.

When only two navigation satellites are visible, a line solution lies in the sphere of the altitude constraint. It can alternately be assumed that the correct position solution on a constrained altitude sphere is at a point on the line in the plane that lies closest to the previous solution, or that lies on the line intersected by the vector of the navigator's previous velocity solution. Independent velocity information is available from other sources, such as the airspeed indicator of a plane or the speedometer of a car. So half dead reckoning can be implemented at minimal cost, e.g., prior art hardware can generally be used as is.

The present invention is not a clock-coasting method and needs no more accurate a local clock than does conventional GPS navigation. Embodiments of the present invention differ from conventional GPS methods in the way the matrix is computed and in the insertion of a dead-reckoning processing step before taking a GPS fix.

The position solution accuracy approximates that of conventional GPS navigation, at least in one horizontal direction, and reflects a dead-reckoning accuracy in the orthogonal direction. Thus, in half dead reckoning, the quality of the position fixes does not degrade as quickly as in conventional full dead reckoning. GPS navigation, unlike terrestrial systems like OMEGA and LORAN, has the advantage that the transmitters are moving. The direction of dead reckoning orthogonal to the direction GPS navigation rotates in the horizontal with the changing two-satellite condition. Thus, the dead-reckoning errors can eventually be bounded in a variety of directions to limit position solution drift.

The navigation computer 24 reads the transmission time of each GPS satellite's signal from the coding modulated onto it, whether or not there is enough information to navigate and regardless of the accuracy of its own clock. The transmission-time position of each satellite is computed from the ephemeris which is read previously from the data modulation. This position is also independent of its own clock. Once the satellite's position is known, it does not matter that the satellite is actually moving. The range is predicted from the transmission-time positions and used to estimate the position of the receiver 10. The navigation computer 24 then measures a pseudorange from each satellite from the difference between its own estimated time and the decoded transmission time, and scaled by the signal velocity. A discrepancy vector is formed between the measured pseudoranges and the predicted ranges. The discrepancy vector is used in the multiplication with a matrix that transforms the coordinate system from satellite ranges to position and time. The estimated position and time is corrected by such vector.

Navigation modes differ mainly with the constitution of the coordinate-transformation matrix. Such matrix is simply the inverse of the matrix of partial derivatives of ranges with respect to the position coordinates and time error for a simple independent fix using four satellites. The partial derivative of the range, with respect to the time error, is the signal speed, e.g., the speed of light. When more than four satellites are visible, the matrix ordinarily includes tactics to reconcile any discrepancies amongst the redundant measurements. Least-squares and weighted-least-squares criterion are conventionally used.

When only three satellites are visible, e.g., step 40 to step 36, the navigation computer 24 includes a degraded mode that assists the GPS navigation solution with an independent measurement or estimate of altitude. This makes up, in part, for the lack of ranging information from the missing satellite. Such estimate of altitude may be the antenna height above the waterline for a ship, the barometric altitude for a land vehicle or aircraft, or simply the last altitude known from a four-satellite GPS fix. The altitude contribution to the partial-derivative matrix differs from a satellite's in that the partial derivative of altitude with respect to time error is zero.

When only two satellites are visible, GPS navigation is not stopped. The navigation computer 24 continues, e.g., step 44, in a further degraded mode that provides one-dimensional position information at any one time at the assumed altitude. In such half-dead-reckoning mode, the receiver position is projected by dead reckoning. Such projection is then corrected by the GPS information available in one axis only, perpendicular to the single available horizontal line of position.

Starting with the partial-derivative matrix:

$$a = \frac{da}{dx} x + \frac{da}{dy} y + \frac{da}{dz} z + ct,$$

$$b = \frac{db}{dx} x + \frac{db}{dy} y + \frac{db}{dz} z + ct, \text{ and}$$

$$h = \frac{dh}{dx} x + \frac{dh}{dy} y + \frac{dh}{dz} z,$$

where a and b are the pseudorange discrepancies to the two visible satellites, h is the altitude discrepancy, t is the time error, and c is the signal speed. To invert the matrix, abandon solving for t by moving it to the left side of the equation, $$a - ct = \frac{da}{dx} x + \frac{da}{dy} y + \frac{da}{dz} z,$$

$$b - ct = \frac{db}{dx} x + \frac{db}{dy} y + \frac{db}{dz} z, \text{ and}$$

$$h = \frac{dh}{dx} x + \frac{dh}{dy} y + \frac{dh}{dz} z.$$

Inverting the matrix to solve for x, y, and z, $$x = m_{13}(a-ct) + m_{12}(b-ct) + m_{13}h,$$
$$y = m_{23}(a-ct) + m_{22}(b-ct) + m_{23}h,$$
$$z = m_{33}(a-ct) + m_{32}(b-ct) + n_{33}h.$$

To find t, the square of the position update r is minimized to constrain the update to the direction perpendicular to the line of position, $$r^2 = x^2 + y^2 + z^2,$$

$$\frac{dr^2}{dt} = 2x \frac{dx}{dt} + 2y \frac{dy}{dt} + 2z \frac{dz}{dt} = 0,$$

$$\frac{dx}{dt} = -(m_{11} + m_{12})c,$$

$$\frac{dy}{dt} = -(m_{21} + m_{22})c,$$

$$\frac{dz}{dt} = -(m_{31} + m_{32})c,$$

$$[m_{11}(a + ct) + m_{12}(b - ct) + m_{13}h](m_{11} + m_{12}) +$$
$$[m_{21}(a - ct) + m_{22}(b - ct) + m_{23}h](m_{21} + m_{22}) +$$
$$[m_{31}(a - ct) + m_{32}(b - ct) + m_{33}h](m_{31} + m_{32}) = 0,$$

$$t = \frac{1}{c} \frac{(m_{11}a + m_{12}b + m_{13}h)(m_{11} + m_{12})}{(m_{21}a + m_{22}b + m_{23}h)(m_{21} + m_{22})}$$
$$\frac{(m_{31}a + m_{32}b + m_{33}h)(m_{31} + m_{32})}{2\ 2\ 2}$$

$$= \frac{1}{cD} N - (m_{11} + m_{12}) + (m_{21} + m_{22}) + (m_{31} + m_{32}).$$

This result is consolidated into a new coordinate-transformation matrix, $$x = n_{11}a + n_{12}b + n_{13}h,$$
$$y = n_{21}a + n_{22}b + n_{23}h,$$
$$z = n_{31}a + n_{32}b + n_{33}h,$$
$$t = n_{41}a + n_{42}b + n_{43}h,$$

where, $n_{11} = m_{11} - (m_{11} + m_{12})[m_{11}(m_{11} + m_{12}) + m_{21}(m_{21} + m_{22}) + m_{31}(m_{31\ m32})]/D$ $n_{12} = m_{12} - (m_{11} + m_{12})[m_{12}(m_{11} + m_{12}) + m_{22}(m_{21} + m_{22}) + m_{32}(m_{31} + m_{32})]/D$ $n_{13} = m_{13} - (m_{11} + m_{12})[m_{13}(m_{11+m12}) + m_{23}(m_{21}m_{22}) + m_{33}(m_{31}m_{32})]/D$ $n_{21} = m_{21} - (m_{21} + m_{22})[m_{21}(m_{11} + m_{12}) + m_{21}(m_{21} + m_{22}) + m_{31}(m_{31} + m_{32})]/D$ $n_{22} = m_{22} - (m_{21} + m_{22})[m_{22}(m_{11} + m_{12}) + m_{22}(m_{21} + m_{22}) + m_{32}(m_{31} + m_{32})]/D$ $n_{23} = m_{23} - (m_{21} + m_{22})[m_{23}(m_{11} + m_{12}) + m_{23}(m_{21} + m_{22}) + m_{33}(m_{31} + m_{32})]/D$ $n_{31} = m_{31} - (m_{31} + m_{32})[m_{31}(m_{11} + m_{12}) + m_{21}(m_{21} + m_{22}) + m_{31}(m_{31} + m_{32})]/D$ $n_{32} = m_{32} - (m_{31} + m_{32})[m_{32}(m_{11} + m_{12}) + m_{22}(m_{21} + m_{22}) + m_{32}(m_{31} + m_{32})]/D$ $n_{33} = m_{33} - (m_{31} + m_{32})[m_{33}(m_{11} + m_{12}) + m_{23}(m_{21} + m_{22}) + m_{33}(m_{31} + m_{32})]/D$ $n_{41} = (1/c)[m_{11}(m_{11} + m_{12}m_{21}(m_{21} + m_{22}) + m_{31}(m_{31} + m_{32})]/D$ $n_{42} = (1/c)[m_{12}(m_{11} + m_{12}m_{22}(m_{21} + m_{22}) + m_{32}(m_{31} + m_{32})]/D$ $n_{43} = (1/c)[m_{13}(m_{11} + m_{12}m_{23}(m_{21} + m_{22}) + m_{33}(m_{31} + m_{32})]/D$ Or, in summary form, $n_{4j} = (1/c)k_j$; otherwise $n_{ij} = m_{ij} - (m_{i1} + m_{i2})k_j$ where, $$k = \frac{\sum_{i=1}^{3} m_{ij}(m_{11} + m_{12})}{j \sum_{i=1}^{3} (m_{11} + m_{12})}.$$

Because $n_{41} + n_{42} = -(1/c)$, and otherwise $n_{i1} + n_{i2} = 0$, the navigation computer 24 makes no use of the previous time estimate.

The geometric dilution of precision (GDOP) is conventionally calculated, e.g., by summing the squares of the appropriate matrix elements. The unnormalized vector, $m_{i1} + m_{i2}$, provides the direction the fix is not constrained, and may be displayed for the user's information.

Receiver embodiments of the present invention can include a navigation computer having a computer process for starting with a partial-derivative matrix, such as:

$$a = \frac{da}{dx} x + \frac{da}{dy} y + \frac{da}{dz} z + ct,$$

$$b = \frac{db}{dx} x + \frac{db}{dy} y + \frac{db}{dz} z + ct, \text{ and}$$

$$h = \frac{dh}{dx} x + \frac{dh}{dy} y + \frac{dh}{dz} z,$$

where a and b are the pseudorange discrepancies to the two visible satellites, h is the altitude discrepancy, t is the time error, and c is the signal speed.

Such computer process further provides for inverting the matrix that avoids solving for t by moving it to the left side of the equation, as in:

$$a - ct = \frac{da}{dx} x + \frac{da}{dy} y + \frac{da}{dz} z,$$

$$b - ct = \frac{db}{dx} x + \frac{db}{dy} y + \frac{db}{dz} z, \text{ and}$$

$$h = \frac{dh}{dx} x + \frac{dh}{dy} y + \frac{dh}{dz} z.$$

In alternative embodiments of the present invention, a computer is further used for inverting the matrix to solve for x, y, and z, as in:

$$x = m_{13}(a-ct) + m_{12}(b-ct) + m_{13}h,$$

$$y = m_{23}(a-ct) + m_{22}(b-ct) + m_{23}h,$$

$$z = m_{33}(a-ct) + m_{32}(b-ct) + m_{33}h.$$

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A half-dead reckoning satellite navigation receiver comprising:

an L-band microwave radio receiver for tracking and acquisition of two, three, four or more orbiting navigation satellites and for computing navigation solutions from the signals from the available satellites; and a navigation computer connected to the radio receiver and that provides for navigation when only three satellites are visible by constraining the altitude, and provides for a half-dead-reckoning mode of operation when only two satellites are visible by providing a one dimensional satellite navigation solution;

wherein, the receiver position is projected by dead reckoning with the projection corrected in one axis only that is perpendicular to the available horizontal line of position.

2. The receiver of claim 1, wherein:

the navigation computer provides said one-dimensional position information at any one time at said constrained altitude where said half-dead-reckoning mode projects the receiver position by dead reckoning and then corrects said projection in one axis only perpendicular to a single available horizontal line of position.

3. The receiver of claim 1, wherein:

the navigation computer includes computational means for starting with a partial-derivative matrix:

$$a = \frac{da}{dx} x + \frac{da}{dy} y + \frac{da}{dz} z + ct,$$

-continued $$b = \frac{db}{dx} x + \frac{db}{dy} y + \frac{db}{dz} z + ct, \text{ and}$$

$$h = \frac{dh}{dx} x + \frac{dh}{dy} y + \frac{dh}{dz} z,$$

where a and b are the pseudorange discrepancies to the two visible satellites, h is the altitude discrepancy, t is the time error, and c is the signal speed; and means for inverting said matrix that avoids solving for t by moving it to the left side of the equation, $$a - ct = \frac{da}{dx} x + \frac{da}{dy} y + \frac{da}{dz} z,$$

$$b - ct = \frac{db}{dx} x + \frac{db}{dy} y + \frac{db}{dz} z, \text{ and}$$

$$h = \frac{dh}{dx} x + \frac{dh}{dy} y + \frac{dh}{dz} z.$$

4. The receiver of claim 3, wherein:

the navigation computer further includes computational means for inverting said matrix to solve for x, y, and z, $$x = m_{13}(a-ct) + m_{12}(b-ct) + m_{13}h,$$

$$y = m_{23}(a-ct) + m_{22}(b-ct) + m_{23}h,$$

$$z = m_{33}(a-ct) + m_{32}(b-ct) + m_{33}h;$$

wherein x, v, and z are position coordinates.

5. A method of half-dead-reckoning navigation, the method comprising the steps of:

determining if only two orbiting navigation satellites are visible to a satellite navigation receiver;

if only two orbiting navigation satellites are visible, then projecting the position of the receiver by dead reckoning; and correcting said projection in one horizontal axis only with information provided by said two visible orbiting navigation satellites.

6. The method of claim 5, wherein:

the step of correcting is such that the information provided by said two visible orbiting navigation satellites describes a one-dimensional line solution of position at an assumed altitude.

7. The method of claim 5, further comprising:

bounding a projection obtained by projecting the position of the receiver by dead reckoning with an additional set of measurements taken from said two visible orbiting navigation satellites that provide a plurality of different one-dimensional line solutions of position;

wherein said projections are useful to bound the dead reckoning solutions in a variety of directions by virtue of a changing geometry of any visible satellites then beings tracked.

* * * * *